US 12,206,517 B2

(12) United States Patent
Brickner et al.

(10) Patent No.: US 12,206,517 B2
(45) Date of Patent: *Jan. 21, 2025

(54) SYSTEMS AND METHODS FOR PROCESSING AND UTILIZING VIDEO DATA

(71) Applicant: Mercury Analytics, LLC, Washington, DC (US)

(72) Inventors: Scott James Brickner, Washington, DC (US); Matthew Thomas Williams, Reston, VA (US); Peter Calvin Viss, Bethesda, MD (US); Elizabeth Michael Karen, Austin, TX (US); James Lord Ardery, Washington, DC (US)

(73) Assignee: Mercury Analytics, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,122

(22) Filed: Feb. 12, 2024

(65) Prior Publication Data
US 2024/0187270 A1  Jun. 6, 2024

Related U.S. Application Data

(63) Continuation of application No. 17/681,951, filed on Feb. 28, 2022, now Pat. No. 11,902,042.

(51) Int. Cl.
*H04L 12/18* (2006.01)
*G06F 40/295* (2020.01)
*G06V 20/40* (2022.01)
*G10L 15/26* (2006.01)

(52) U.S. Cl.
CPC ........ *H04L 12/1831* (2013.01); *G06F 40/295* (2020.01); *G06V 20/41* (2022.01); *G06V 20/47* (2022.01); *G10L 15/26* (2013.01)

(58) Field of Classification Search
CPC ..... G06F 40/295; G06F 40/279; G06V 20/47; G06V 20/41; G10L 15/26; H04L 12/1831; G11B 27/10
USPC ....................................................... 386/241
See application file for complete search history.

(56) References Cited

U.S. PATENT DOCUMENTS

| 2008/0140385 A1* | 6/2008 | Mahajan | G10L 15/18 704/251 |
| 2020/0126559 A1* | 4/2020 | Ochshorn | G11B 27/031 |
| 2020/0342472 A1* | 10/2020 | Coffman | G06N 20/00 |

* cited by examiner

*Primary Examiner* — Thai Q Tran
*Assistant Examiner* — Nienru Yang

(57) ABSTRACT

A method includes receiving, from an entity, a request to organize a survey on a topic, based on the request, organizing a survey of a plurality of people, recording a video of the survey, obtaining a transcription of the video and linking the transcription of the video in time to the video to yield a processed video. The method can further include presenting, on a user interface to the entity based on the processed video, the video and the transcription of the video, wherein each word in the transcription of the video is selectable by the entity, receiving a selection of text by the entity from the transcription of the video and, based on the selection of the text, presenting a portion of the video at a time that is associated with when a participant in the video spoke the text.

20 Claims, 9 Drawing Sheets

SYSTEMS AND METHODS FOR PROCESSING AND UTILIZING VIDEO DATA

PRIORITY CLAIM

The present application is a continuation of U.S. patent application Ser. No. 17/681,951, filed Feb. 28, 2022, the contents of which is incorporated herein by reference in its entirety.

TECHNICAL FIELD

The present disclosure generally relates to focus groups or videos of focus groups or other videos and introduces a new technology that receives a video, processes the video to generate a transcript of the video coordinated in time with portions of the processed video and provides users with tools to view and manipulate the processed video.

INTRODUCTION

Focus groups provide valuable research on human subjects. A focus group consists of a group of people typically having a particular set of characteristics. Members of the focus group are asked to provide input in response to questions, videos, commercials, advertisements or other data. A company may use a focus group to gather customer feedback on a new product or service before they decide to take the concept into development. Focus groups are used to increase knowledge in fields such as social research, marketing, demography and politics.

Focus groups are often videotaped. The company that commissioned the focus group will then review the videotape in order to identify and record patterns, opinions or other data. Often this approach requires a user to manually review the video of the focus group to retrieve such data. This requirement can also arise in any other type of video of a presentation in which after the completion of the video, users have to manually review the contents in order to retrieve data from the particular video.

BRIEF SUMMARY

What is needed in the art related to conducting focus groups and more broadly to the use of video is a new tool or framework that will receive a video of the focus group or any other type of video and perform certain processing of the video in order to enable users to more easily obtain desirable information from the video.

First, the user of the tool will create or obtain a video. For example, a video may be created from a Zoom conference call as would be known by those of skill in the art. See www.zoom.us for more details about how Zoom works. The Zoom conference call may have three participants, Mary, Bob, and John. As each person speaks, the video or user interface highlights the speaker's image so that it can be presented larger than the others as they are the current active speaker. Zoom has the capability of being able to record all of the interactions and the audio that are seen by the participants in the Zoom conference call. Of course the principles disclosed herein are not limited to Zoom in that any video can be ingested into the system that is disclosed herein. For example, videos stored on YouTube could be retrieved and ingested into the system. Furthermore, the functions disclosed herein could also be integrated into a service like YouTube or Zoom, or any other service associated with videos.

Typical characteristics for the video that is processed by the tool herein could include the use of multiple speakers, some changes in the video or images that are shown where, for example, users may share their screen to show a graphic or video to the other participants in the conference call. The tool disclosed herein will receive a video and automatically perform a number of different operations of the video. Specifically, the tool will use artificial intelligence, machine learning techniques, or other capabilities to generate a transcript of the video. Where different users are speaking, the tool can differentiate the voices of different users. In some cases, the tool may be able to identify the user's name via the metadata or optical character recognition in which a user's name might be presented below their frame in the conference call. In addition, the transcription is linked in time to the video. Furthermore, since individual speakers are identified, later, when a user selects a word or text from the transcript, the system can automatically play the video at the point of the chosen text through to the conclusion of that speaker or push to the next speaker. In one example, when a user selects text, the system can push to the next speaker to define a segment, clip or snippet of the video or to play from the text through to the conclusion of that speaker. Clips can be generated from the choice of a word in the transcript to the next speaker. The user can then download the text of a clip or can download a highlights video of one or more clips.

The tool has other capabilities to enable a user to identify clips or snippets of video and concatenate them together into a highlight video. After the video is processed to yield a processed video, a user interface is presented which enables a number of different functions to be performed by a user. For example, the user can click on a word of the transcript and the particular time frame in which the words spoken in the video can be presented to the user. A "clip to next speaker" function can also identify a portion of the video from a chosen word through the end of that speaker's comment and store the clip for editing and inclusion in a highlight video. The user can have the chosen clips collected together in the highlight video as desired. The user could highlight a section of text, for example, from the transcript and the video of that text can be played.

The tool may be a stand-a-lone tool to which a video or a universal resource locator (URL) is provided to an upload or ingest of the tool. Such a tool may also be integrated into a videoconferencing service such as Zoom, Skype, GoToMeetings, WebEx, YouTube, etc. the tool could also be integrated into a social media network as well.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. Any component or concept in one figure or one embodiment can be used in another figure or embodiment. It should be understood that various changes may be made in the function and arrangement of elements without departing from the spirit and scope of the application as set forth in the appended claims.

Figure 1:
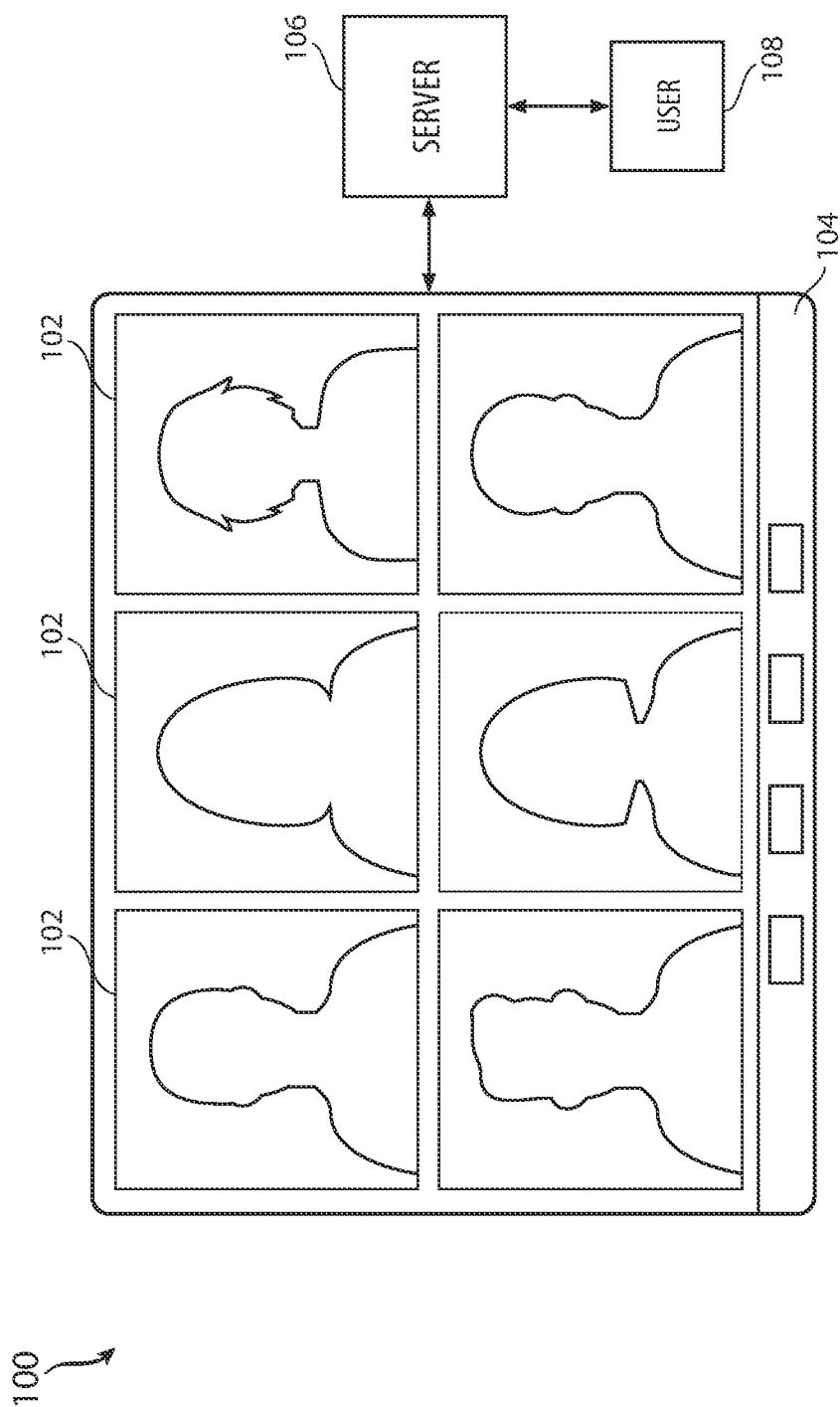
FIG. 1 an example survey video and associated server and user device.

FIG. 1 illustrates a user interface 100 that relates to a video of the survey. The users 102 with user devices (not shown in FIG. 1) are the participants in the survey. A network server 106 can manage the survey and provide the necessary user interfaces for the respective individuals 102. Control buttons 104 can be presented to enable users to perform such functions as sharing their screen, muting themselves, and so forth. A user device 108 can communicate with the server 106 to request the survey and provide the necessary data and instructions for the entity that operates the server 106 to carry out the survey.

In general, this disclosure introduces new tools that can be built into or programmed into a server 106 that is managed by an entity that performs or carries out surveys of individuals to obtain their opinions on a variety of topics. For example, a user 108 may desire a survey on how well their product is accepted in the marketplace or how well the candidate is liked in a political election. Currently, there is no tool or mechanism provided by a survey company to carry out the survey and then provide a set of tools for the entity that requested the survey to easily obtain targeted data from a video of the survey. In one aspect, the tool disclosed herein could be called a survey management module that is programmed into the server 106 to perform the specific operations and functionality that is disclosed herein. In this regard, the server 106 can become a special purpose computer which carries out the particular functions according to its programming.

It is known that multiparty video conferences can be recorded. However, in the context of the survey, there are a number of different features disclosed herein which are not available in the marketplace and which are novel inasmuch as they apply to the processing of videos having survey data, which involve multiple different users with each commenting on the survey topic.

After a survey of the type shown in FIG. 1 is carried out, the server 106 can automatically process the video which is the recording of the survey to perform automatic speech recognition and generate a transcription of the video. Additionally, the server 106 performs a high precision timing correlation between the transcription and the video itself. This processing is in preparation for presenting data associated with the video to the user device 108. Depending on the context, additional metadata can be provided to the tool. For example, highlighting in a Zoom conference is used to identity who the system considers is the main speaker. Muted speakers are often on the call and just listening. Users can un-mute themselves or turn off or on their video feed. For some users, the main speaker has a video frame that is larger than all the others. These transitions and graphical features can generate or be used to generate metadata that can be used in connection with the video processing to help identify speakers, transitions, and so forth. The tool transforms the video into a processed video with enhanced characteristics and data which can then be accessed by a user via a portal. The new programming disclosed herein generates or transforms the original video into a package of data that combines a transcript, synchronization data, and other functionality made available to users that would not be possible with the video alone.

The user of the user device 108 can have a portal or an account with a server 106 which enables them to access the processed video and a particular user interface which enables them to retrieve particular data associated with the video. The various new functions associated with the processed video are described herein.

Figure 2A:
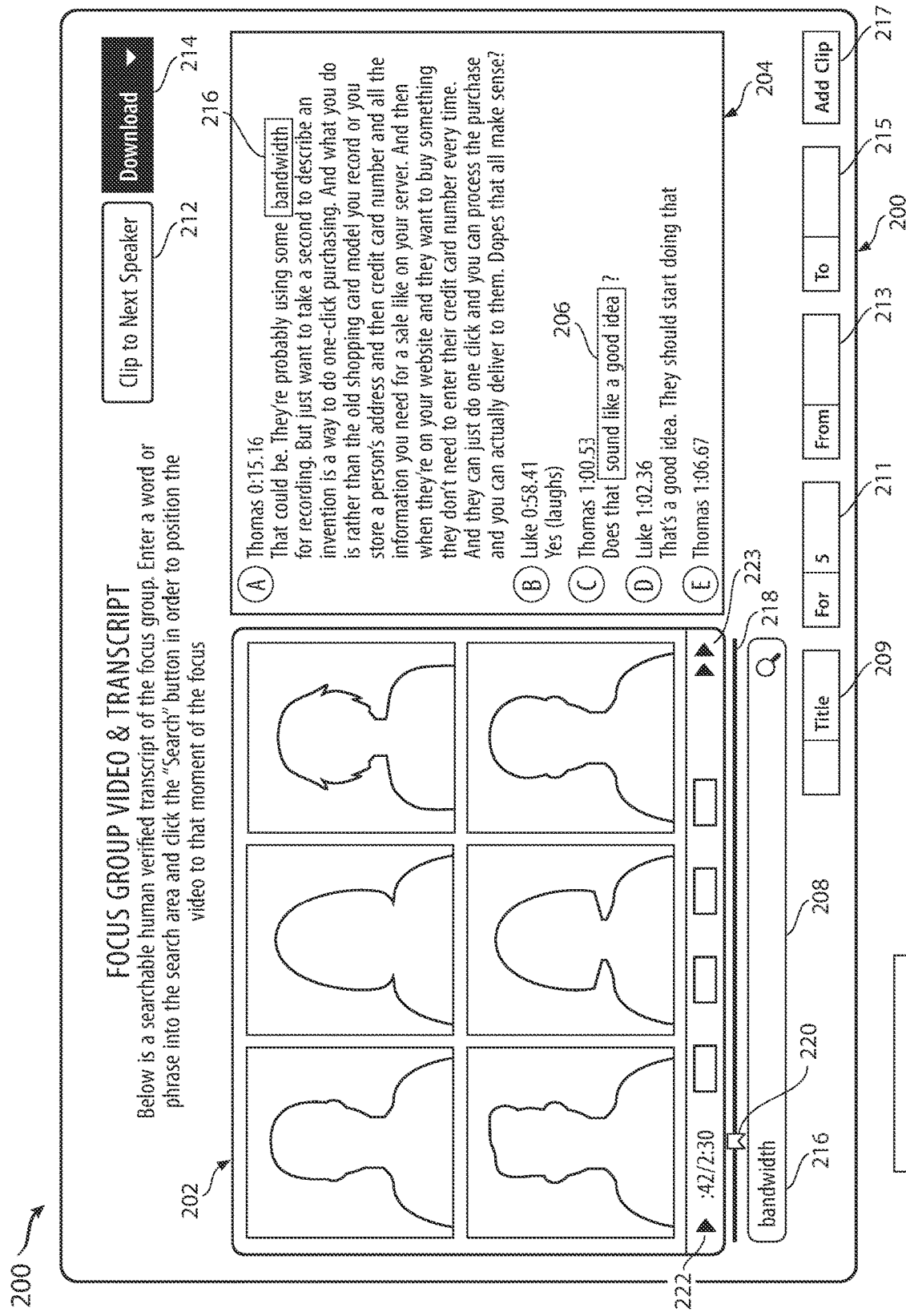
FIG. 2A illustrates an example user interface.

FIG. 2A illustrates a user interface 200 which can be provided through a user device 108 as received from the server 106. The user interface 200 includes a presentation of the video 202, a transcription 204, a search field 208, a presentation of the transcript 204, other control options 210, a "clip to next speaker" option 212, and a download option 214. Using this interface 200, a user can highlight a word or words 206. In one aspect, as the user highlights a word or words 206, the video 202 can play from that point forward. If the user selects a single word 216, the system can play the video from that point onward or from that point to the next speaker. For example, speaker Thomas at point A is speaking some words including word 216. The user-selected word 216 and the video 202 proceed from that point until point B where speaker Luke starts speaking. A clip of that portion of the video can be generated as well and either be separately shown, shared or added to a list of clips for a highlight video.

To generate a clip, an input field 209 can be provided which can receive a title of a clip to be input. A duration field 211 can enable the user to simply define how long the clip is (5 seconds in this example). Or, as an alternative, once the user identifies the word 216 that should begin the clip, the starting time 213 for that would can be populated automatically or manually by the user in an input field 213 and an ending time or "to" time can be put into field 215. In one example, once a user selects a word or words in the text 204, the system may assume that the user desires to create a clip of the video starting from the time of the chosen word 216 to the end of the speaker's comments. The user can of course change this duration manually as well. The system can also be set with a profile to change the automated settings. For example, the system may be set to simply choose a period of time from the chosen word 216 or from the starting time, such as 20 seconds, to an ending time for the clip.

The user can then "add clip" 217 using a selectable object. A listing of the created clips can be shown on the user interface 200. The listing can have a selectable object associated with each clip that the user can select or a selectable object to create a highlight video of one or more of the clips as desired by the user.

Figure 2B:
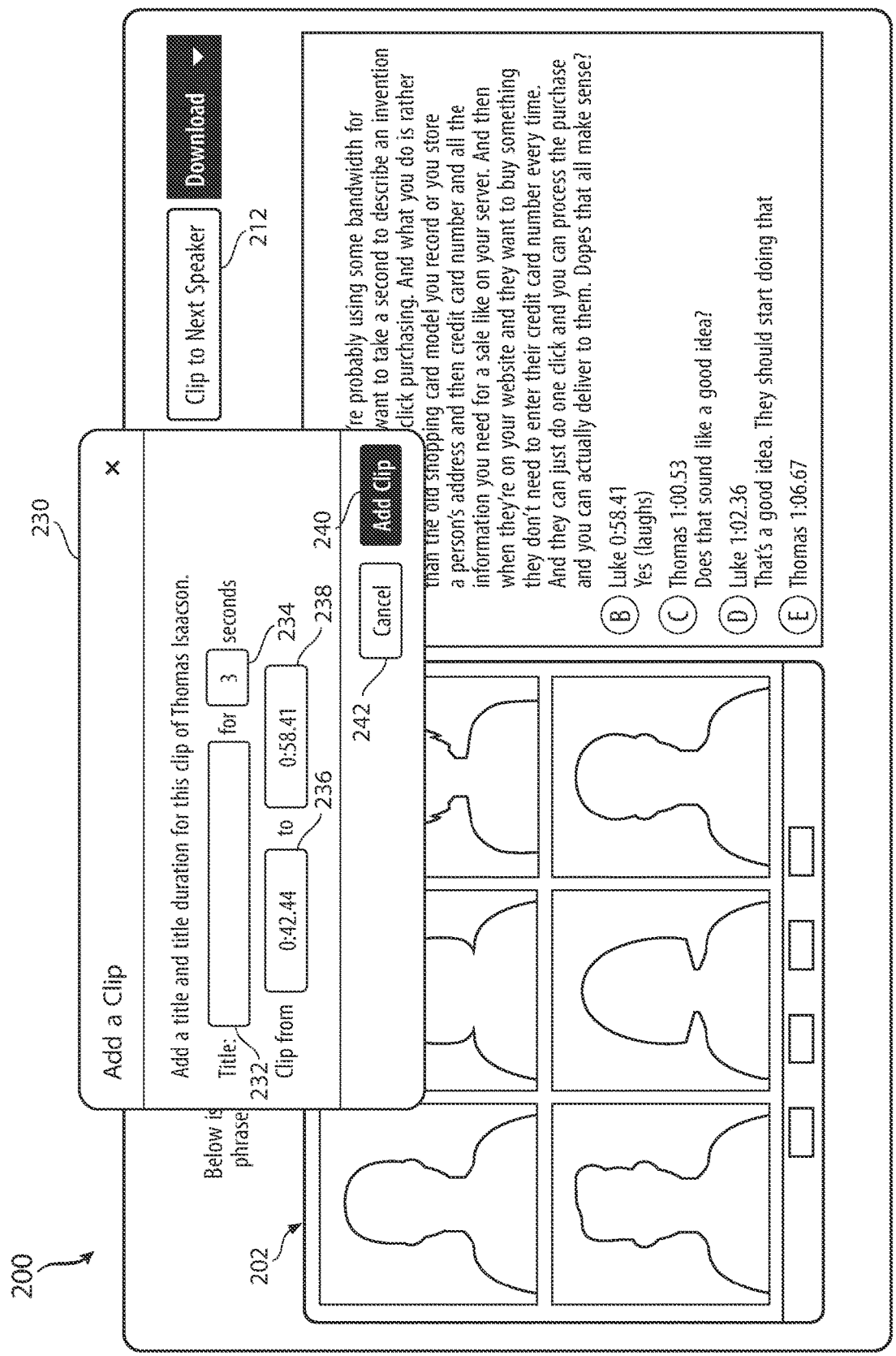
FIG. 2B illustrates the clip to next speaker feature.

In another aspect, the user can highlight a word 216 and then interact with the button "clip to next speaker" 212 in which the system will make a clip of the video from the point of the chosen word 216 to the beginning of the next speaker. This option is illustrated in FIG. 2B. This feature is advantageous because in the context of a survey (or many other types of video discussions such as a board meeting or any type of video with any type of changing event such as a scene) it is desirable to easily capture the individual speaker comments. As shown, if the user selects the clip to next speaker 212 option, a window 230 is presented which enables the user to add a clip to generate a highlight video. The user can provide a title 232 which can be presented for three seconds or any other selectable timeframe 234. Note that the window 230 shows that the clip is from a first time 236 associated with the highlighted word to an end time 238 which is coordinated to be the end time of that user. In the example shown, the user has highlighted the word "bandwidth" 216 which is approximately 42 seconds into the video and the clip concludes at approximately 58 seconds which is when the paragraph by Thomas completes and Luke provides his next comments. In other words, the system automatically selects a clip from the chosen word to the conclusion of that user's statement in preparation for generating a highlight video. Metadata as described herein which is associated with the video can be used to help generate a clip to the next speaker.

In one example, a user may select a chosen word 216. The system can identify a portion of the video from the chosen word 216 to a next speaker in the video. The system can store the portion of the video for selection by a user for inclusion in a highlight video including a subset of the video. User interface 300 in FIG. 3 can illustrate the presentation of various portions of the video.

The user can also play the video 222 and watch the progress in terms of timing or a time indicator 220 relative to the full length time 218 of the video. When the user selects a word 216, the timing indicator 220 can jump to the time in the video that the word is being spoken or heard.

The user can select one or more clips and can add the clip via a button 240 to a group of clips. The user can select one or a group of clips and forward them to a new destination such as a social media application (Facebook, Instagram, TikTok, Twitter, etc.), a YouTube Channel, an email address or texting phone number, and so forth. The user could of course cancel 242 the option and not add the clip to the group of clips.

Another function is accelerated playback. The system, having processed the video, can provide a selectable object 223 which enables a user to have the playback accelerated so that the user can track through the video faster than real time. This accelerated playback can help to find a particular part of the video faster. The system can also slow down the playback so that a user can hear more closely what users have said using a similar selectable object.

Figure 3:
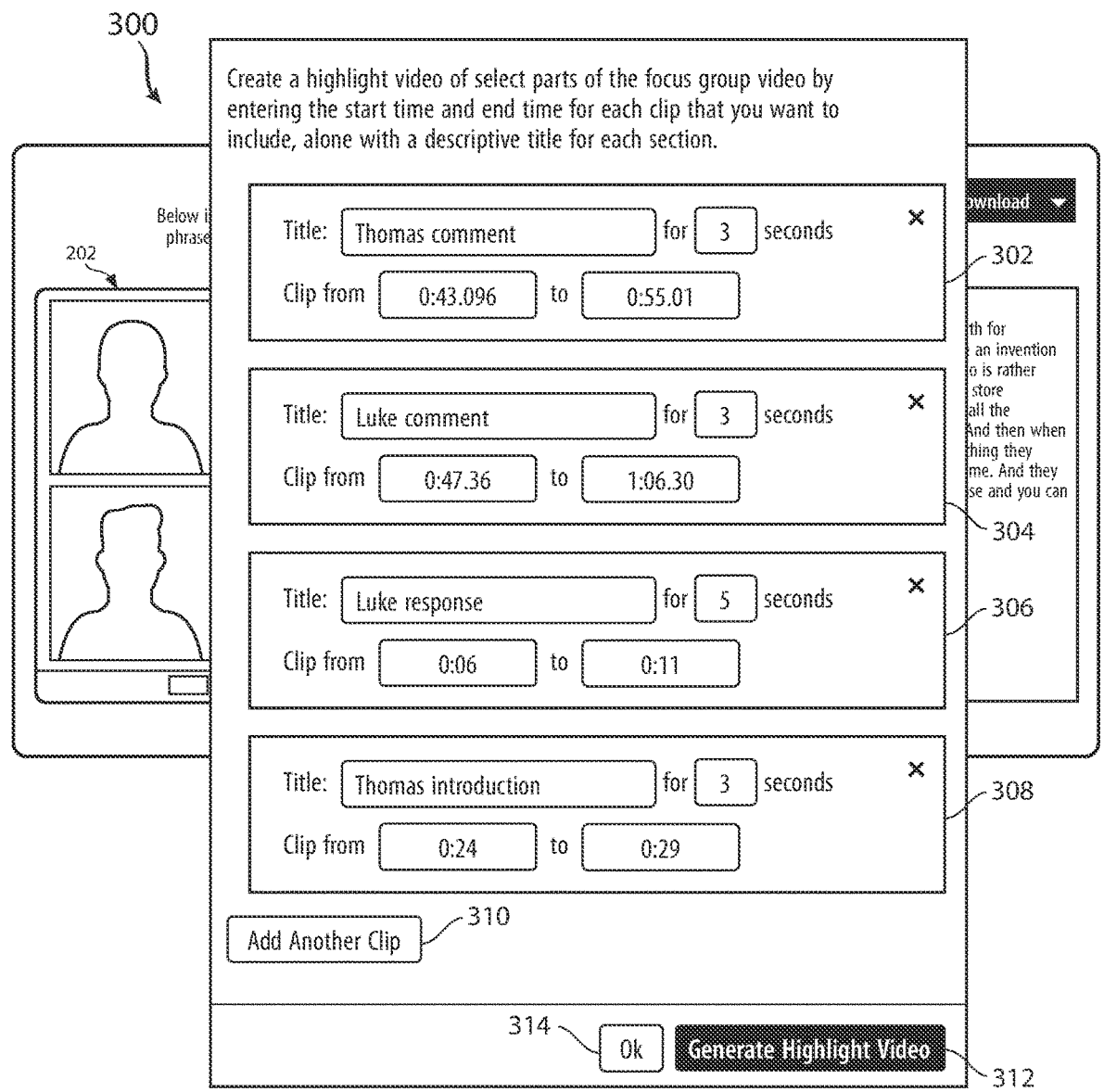
FIG. 3 illustrates an interface to select highlights of selected parts of a focus group video and to generate a highlight video.

FIG. 3 illustrates a user interface 300 which shows the various clips that are selected. For example, a first clip 302 is entitled "Thomas comment" and that title will show for 3 seconds. The time frame of the clip is shown in this window. A second clip 304 is entitled "Luke comment", which title will show for three seconds, while the clip plays from the identified time frame. A third clip 306 and a fourth clip 308 are shown with their titles and time frames as well. Options in window 300 for the user to select include the option to add another clip 310, generate a highlight video 312 or simply click on "OK" 314 to record or store any changes made. This interface 300 enables a user to manipulate and select options associated with each respective clip with respect to its title, how long the title is presented, and the length of the clip. The user can then generate a highlight video 312 which automatically concatenates the various clips into a single highlight video which the user could download, share post, or otherwise distribute. The user interface 300 enables the user to adjust the portions of the video that are clipped from a chosen word to a next speaker. The timing of titles and the timing of each clip can be adjusted from the pre-set values or timings that are again based on the first timing from the chosen word to the conclusion of the timing which is the start of the next speaker.

The capabilities of the system can also include other functions. For example, the user interface 300 in FIG. 3 could enable users to select and download a particular clip. Such functionality can be useful for videos which might include a series of segments such as a piano recital or a sporting event. The system may generate clips for any such segment and users may be able to select and download in an easy fashion a desired clip of their own child. In this regard, the functionality of clipping to the next speaker could be expanded to clip to the next piano piece or clip to the next football play and so forth. In a news broadcast, the system could clip to the next story. In a movie, the system could clip to the next scene. Thus, the machine learning or artificial intelligence analysis could be trained to determine such breaks in the video. Metadata as described herein can be applied to identify a next speaker, scene, and so forth.

The tool can enable an individual, for example, to adjust or upload their video to the tool. Options can be presented to identify how to analyze or break up the video. A user can indicate that the video is a football game or piano recital or a survey. User input could identify that the clips should be generated or processed based on different football plays, piano performers, songs, stories, and so forth. Then, the tool can process the video according to the instructions and particular machine learning algorithms could be accessed and applied in order to generate the proper clips or clips. In other words, a plurality of machine learning algorithms could be available and one or more would be chosen to process the video for breaking events such as different speakers, scenes and so forth. Furthermore, with the processing that is tailored to the particular instructions or the particular video, a person could select a chosen word or somehow identify a portion of the video and request a "clip to the next X", where X could be the next speaker, football play, piano performer, and so forth.

Thus, in one example, a piano recital can be recorded via Zoom or other means of recording the program. The recorded video could then be processed and the piano teacher could easily go in and use a user interface (similar to FIG. 3) and to confirm the segments or portions related to each respective student and provide titles with the name of each student. Having a processed video with various portions identified, a parent could access an account or user interface similar to what is shown in FIG. 3, and could simply interact with a button to download the portion involving their child. If the parent had two children, they could select the two clips involving their children and have a highlight video generated for them with those two portions concatenated together.

Such functionality can also be built into YouTube or a similar service. Uploaded videos could be processed automatically or with some instruction regarding the type of video being processed. With the transcription provided, timing synchronization, and the identification of how to clip to a next feature, users could then be presented with a user interface in the context of YouTube in order for them to generate a highlight video, download particular clips, add titles, and achieve functionality not currently obtainable or available through services such as YouTube or Zoom.

Further, in the context of YouTube, with the technology disclosed herein, additional functionality can be achieved. For example, a user may have a YouTube channel to which they upload videos. With the processing technology disclosed herein, a user could upload a video, and log into YouTube and either view a number of clips automatically generated or manually generate clips to a next speaker, scene, sports play, and so forth. Again, a screen similar to FIG. 3 could be presented with the various clips. However, the additional functionality could be that a user can generate a highlight video of one or more clips or might select one or more separate clips via buttons or other means of receiving user input, and have the various videos generated by the service and automatically posted or made available on the respective YouTube channel or via another chosen outlet. Users can also share any one or more of the videos (highlight video, clip or chosen group of clips) on social media, as attachments to a text or email, on YouTube or the like, or any other shareable outlets.

For example, options can be presented next to each clip or next to the button to generate a highlight video 312 in which a clip or a highlight video could be posted on a YouTube channel, shared on Facebook or on Instagram, or attached to an email to a recipient. One or more options can be presented in connection with each clip. In this manner, the various different clips and/or the highlight video could be easily distributed, posted, or shared in a manner that is efficient and desirable for the user.

Social media networks also utilize videos that are uploaded or generated via Facebook events in which live streaming or video events are presented on the social media application or website. The functionality described herein could also be built into a social media network in which such events could be recorded and processed and one or more of the posting entity of the Facebook event or a recipient or viewer of the event could have the kinds of options described herein to be able to see at transcript, select one or more clips, generate a highlight video, and share one or more of these subcomponents of a video to one or more destinations such as a YouTube channel, other social network, or the same social network. Users could view a recorded Facebook event and be given the option to search the transcript using a search field 208, clip to the next event, download or post a clip of the event as desired to their Facebook Page, other social media site, YouTube channel or elsewhere.

Other contexts could also incorporate the concepts disclosed herein. For example, a satellite television or video service which presents prerecorded or live video to users who select channels or use Apple TV to select videos can incorporate the functionality disclosed herein. Thus, for any video that is presented on any media format or television format, the service could present the user with options to search a transcript and jump to a particular word, to clip to a next speaker or to a next scene, and so forth, download one or more clips or a highlight video, and gain functional access to the video that is currently not available through the traditional viewing environments that are on the market today.

These various environments might have their own functionality associated with implementing the concepts described herein. However, no matter what the environment is, general operations or method steps would include processing the video as described herein to obtain a transcription, performing timing synchronization, applying machine learning or artificial intelligence analysis to identify a next event, utilizing metadata in processing the video, and so forth, to enable the user to generate one or more portions of the video as video clips that can be concatenated together to generate a highlight video and/or can be shared individually or as groups in a number of different ways. For example, various operations can be provided, such as presenting user interfaces, receiving user input or user selections, performing automatic functions such as initiating the processing of the video, or selecting clips having a certain type of content according to store instructions, generating one or more clips, generating a highlight video based on selected clips, and/or sharing or forwarding a sub-portion of the video as generated herein. The operations can include posting on a video-related application or site a clip associated with a highlight video that is generated as described herein. Any one or more of these various steps can be implemented in the context of a method of providing processing of the video and the ability of a user to interact with the processed video in ways to achieve the selection of particular clips associated with the video, the generating the highlight video, clipping to a next event (speaker, scene, player, sports play, etc.), and so forth.

The various functions can be presented in the context of a social media environment, an application environment, a YouTube or video storage and presentation environment, or a video conferencing environment such as Zoom or the like. A tool connected to any of these services, in addition to a service that organizes and carries out surveys on video, can be implemented as an enhancement to any environment that utilizes or is associated with video or audio files.

Figure 4:
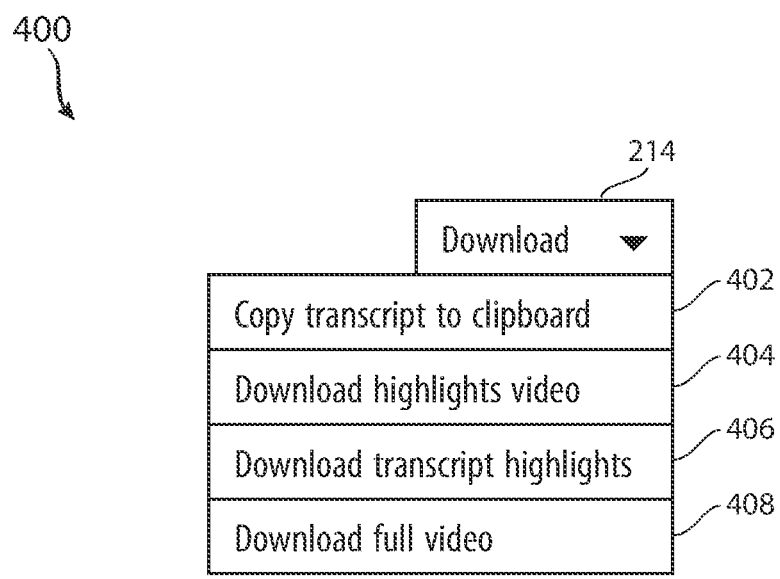
FIG. 4 illustrates download options.

FIG. 4 illustrates the options 400 that are presented when a user interacts with the download button 214. For example, an option can be presented in a drop down menu to copy the transcript to a clipboard 402. Another option can include downloading the highlight video 404. This is a highlight video generated from the clips organized and selected as described above. The user can also download transcription highlights 406. These can represent the transcription of just the highlight video. This transcription can include titles and time frames for the speakers and the time frame of the portion of the transcription included in the transcription highlights. Another option is in the download the full video 408. As noted above, these features can be implemented in a tool associated with any number of different environments in addition to a survey management entity. Other options can be presented as well depending on the context. For example, one option might be to post a clip or highlight video on a social media site, or to post the highlight video on a user's YouTube channel, and so forth.

Figure 5:
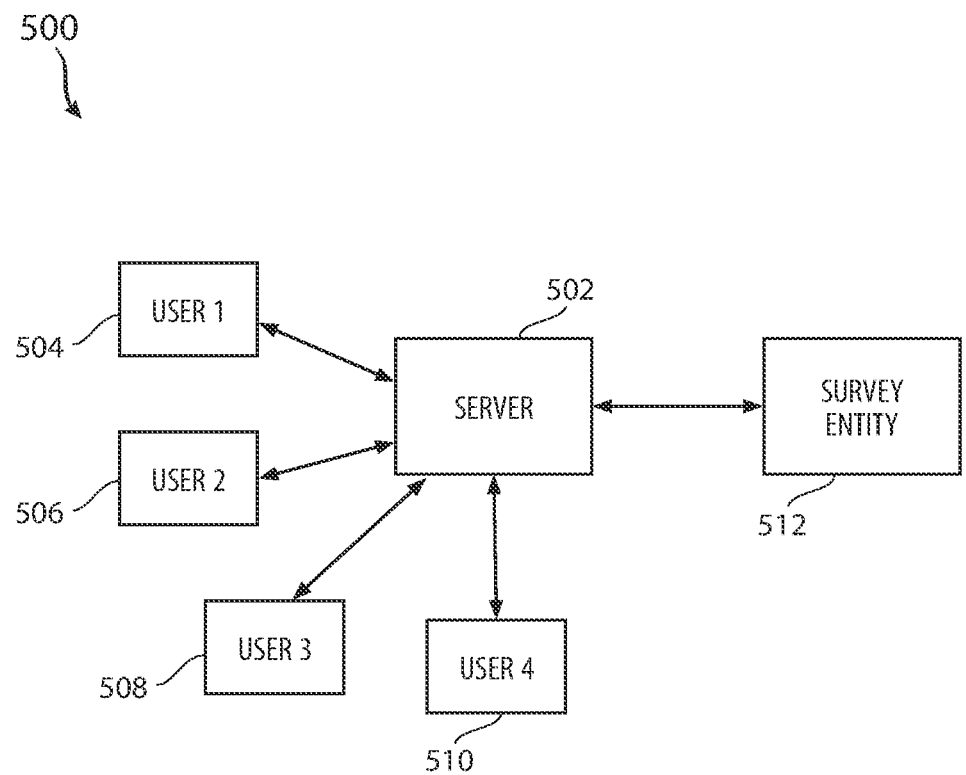
FIG. 5 illustrates the various nodes of a system according to an aspect of this disclosure.

FIG. 5 illustrates an example system 500 that can be used to provide the functionality disclosed herein. For example, a server 502 can include the modules or program software that carries out the survey or other video, records the video, and generates or processes the video to generate a user interface disclosed herein so that the functionality becomes available in connection with the processed video. For example, a first user device 504, a second user device 506, a third user device 508 and a fourth user device 510 can be utilized by respective users to produce the survey via a conferencing service such as Zoom in connection with the server 502. An entity device 512 can be used to connect to the server 502 to request the survey and to later log into a portal or an account to utilize the interfaces described herein in order to obtain a highlight video, a transcription of highlighted portions, and so forth.

An example system 500 shown in FIG. 5 can include several components. A network-based server 502 can include the primary programming and program modules which are utilized to perform various operations such as presenting user interfaces, establishing videoconferencing connections between various individuals associated with a focus group, receiving and performing data analysis and presentation, presenting the proper user interface depending on the type of video conference or other communication that is occurring, managing groups of individuals as the process progresses from a request for a focus group and actually carrying out the focus group, generating transcriptions of the video, synchronizing the transcription on a word by word basis with the video portion of the survey, and so forth.

In one aspect, the system covers the server 502 with its associated functionality. A focus group management module (FGMM) can be operable on the server 502 to provide the functionality disclosed herein and renders the server 502 as a special purpose or special function computing device 502. The functions are not merely mathematical algorithms operating on the server 502 but involve performing a series of operations in a particular order including establishing video conferences and user interfaces that are tailored for different groups of people in the process. The operations can include establishing videoconferencing sessions with different entities, generating and presenting different user interfaces in connection with respective videoconferencing sessions and receiving data and recording or storing data associated with some of the videoconferencing sessions. The functions include the processing of a recorded video in order to generate the transcription and synchronization of the transcription and then to present the functionality disclosed herein particularly with respect to generating a clip to the next feature and to generate a highlight video based on the chosen clips and the respective time frames.

In another aspect, the system can include the server 502 and one or more additional devices 504, 506, 508, 510, 512 that each communicate with the server 502. The particular mode of communication can include a wired communication, wireless protocol (5G, LTE, WiFi, etc.), satellite communication, or any other communication protocol in whole or in part between the respective device 504, 506, 508, 510, 512 and the network-based server 502. Any one or more of the devices 504, 506, 508, 510, 512 can include additional hardware components such as microphones and video cameras used for carrying out video conferences.

A client device 512 can be used by an entity that requests a focus group to be performed. One of the aspects of this disclosure is to provide new tools and functionality to enable a quick organization and implementation of the focus group and the proper continued processing of the reported focus group including generating the transcription and the synchronization processes. For example, assume that an entity desires to obtain feedback from the focus group in connection with a golf tournament that is occurring the next day. The entity might be running the tournament, advertising for the tournament, or in some way connected with an event. One challenge in the existing state of the art would be that if such an entity desired solid focus group data, but once a survey is held and the video is recorded, it is difficult to extract from a survey video the exact portions of interest which the requester of the survey might desire. The new tools and functionality disclosed herein resolve these technical issues and enable the processing of the video of the survey group such that particular functions and capabilities are made available to the requester of the survey in order to, for example, obtain a highlight video of the relative portions of the survey video in a simplified manner. The functionality disclosed herein is not available in the marketplace and this disclosure resolves some of the issues and desires of entities ordering surveys of a particular topic.

Ultimately, focus group members have focus group member devices 504, 506, 508, 510, and will each participate in a focus group as described herein. Each of the devices 504, 506, 508, 510 will typically represent and include the necessary hardware components to enable a video conference to occur. For example, each device 504, 506, 508, 510 can include a video camera, a microphone, and components capable of establishing a communication over a network such as the Internet to the network-based server 502. One of skill in the art will understand these basic components that would be needed. Part of the process disclosed herein is a new functional set of tools that enables the requester of the survey to be able to log into a user portal and explore the transcription of the video and generate clips which can easily be combined into a highlight video for additional analysis.

In one aspect, server 502 represents a service such as YouTube or the like, Zoom or the like, a social media network that posts videos, or any other service related to or that provides the ability to receive and present videos. In other words, the functionality disclosed herein can be incorporated into any website, application, or service that involves videos where it would be desirable for users to be able to interact with the video in the manner disclosed herein. For example, YouTube could incorporate the processing described herein to upload videos to enhance the functionality and the services offered by YouTube. Zoom could also incorporate the functionality disclosed herein to enhance its service. In some cases, the data regarding, for example, participants in the survey or students in the piano recital could be gleaned from the manner in which the video is generated. For example, in a Zoom video call, identification information for each participant on the call is often provided in the video. Such data can be characterized as metadata associated with the video and can be retrieved and used to coordinate or identify or create titles with the person's name in connection with the segment in which that person is speaking. Furthermore, highlighting around a video frame of the person speaking in a Zoom call can also be retrieved and used to identify transitions, speakers, and so forth. Such data could also be gleaned through video analysis and character recognition for videos of conference calls carried out via Zoom that might be uploaded to YouTube for example.

Thus, metadata associated with transitions (of speaker to speaker, play to play, scene to scene, or any type of transition), can be obtained in a number of different ways from events associated with the video as it is being recorded, or through optical character recognition or other analysis of the video that might include hints or suggestions or other data identifying portions or transition points. For example, in Zoom, when a user speaks, that user's video frame is highlighted to know that they are the main speaker. The programming within Zoom that highlights the current speaker can also be modified to generate metadata which can be fed to the processing tool in terms of timing and for use to identify who is speaking at a particular moment. User actions in which users modify their viewing screen in a conference can also generate metadata that can be used to process the video. Any graphical action that occurs during a video can generate metadata for use as described herein.

Thus, the system, based on a selection of a text from a transcription, can clip a portion of the video from a location of the text to a transition point associated with one of a next speaker, a next scene, a next play and a next player. Other transitions are considered as well. The system may also automatically develop the clips to identify different portions or segments and then present in a format shown in FIG. 3 the clips (with titles or not) to a user or entity for confirmation, adjustment and so forth. The entity could also select from the clips shown in FIG. 3 which ones to download into a highlight video such that one or more clips could be included.

For example, if a parent had two children that performed in a piano recital, the parent could go to a portal after the program and see the clips of all of the children that performed in the piano recital, and simply select the clips with their two children. A highlight video would be generated and downloaded with just those two clips for the parent. Of course, a charge could be made for the service and for purchasing or downloading the highlight video.

Audio only files can also be processed by such a service as well an enabling individuals to download transcriptions or audio segments only in a similar manner as is disclosed herein. Transcripts could also be downloaded. The transcription could be of a whole program or of one or more clips of the video or audio program.

In another aspect, depending on the data associated with each clip, advertisements (short ones for example) could be inserted into the clips based on the knowledge available. User names, time of the clip, participants in the clip, the topic of the survey or content, etc. can drive the decisions of what type of advertisement to present in a clip.

In another example, the technology used herein can be provided for legal depositions in which a person is interviewed for their testimony and the interview is recorded. The recording of the interview could be received into a tool as described herein and processed in order to generate a transcription of the video that is also synchronized with the video. Thereafter, an attorney can search the transcription for a particular portion of the testimony and then easily be able to view the portion of the video in order to ascertain the manner in which the witness testified. The technology can also be used for trial testimony as well or any other video having an audio component that includes speech.

Figure 6A:
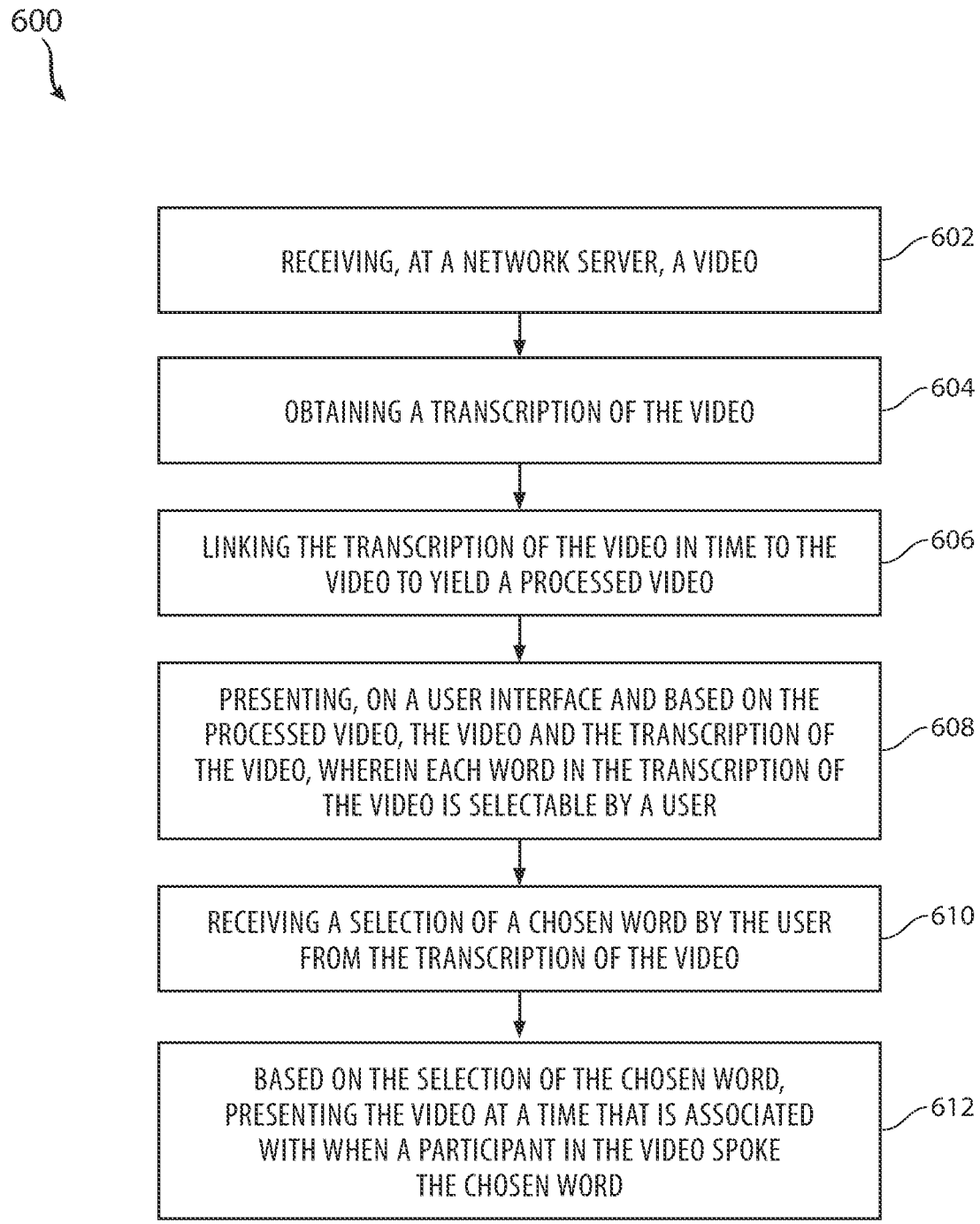
FIG. 6A illustrates a method example.

FIG. 6A illustrates an example method 600 which can be used to generate transcriptions of survey videos and enable improved interactions and access to the data associated with the video. Typically, the method can be practiced by a service that will manage and generate a survey on a particular topic. For example, a company may desire a survey regarding how well its product is liked and how it is used. A politician may desire survey about their campaign and what the public impressions are of the candidate. Thus, in one aspect, part of this disclosure includes additional tools and functionality which can be built into a service that organizes and creates and runs video conference based surveys where different people provide their opinions and answer questions.

A method 600 can include receiving, at a network server, a video (602), obtaining a transcription of the video (604), linking the transcription of the video in time to the video to yield a processed video (606) and presenting, on a user interface and based on the processed video, the video and the transcription of the video, wherein each word in the transcription of the video is selectable by a user (608). The method can further include receiving a selection of a chosen word by the user from the transcription of the video (610) and, based on the selection of the chosen word, presenting the video at a time that is associated with when a participant in the video spoke the chosen word (612).

The method can also further include receiving an identification of a first segment of the video based on a first user interaction with the transcription of the video, receiving an identification of a second segment of the video based on a second user interaction with the transcription of the video, receiving a confirmation from the user to generate a highlight video based on the first segment and the second segment and, based on the confirmation, generating the highlight video can include a concatenation of the first segment and the second segment. The use of the highlight video can be particularly beneficial for entities that contracted to create the survey. Individuals can easily utilize the processing of the video to select and easily generate a highlight video which can include a subset of the original video with portions selected as desired by the entity.

The method can also further include receiving a first title associated with the first segment, receiving a second title associated with the second segment and presenting the first title and the second title in the highlight video. In one aspect, the first segment and the second segment are not contiguous. The segments can be selected from any location within the video and concatenated together whether they are contiguous or not.

The method can further include generating, based on the transcription, a first title associated with the first segment, generating, based on the transcription, a second title associated with the second segment and presenting the first title and the second title in the highlight video. The automatically generated titles can be based on the transcription, video analysis, metadata, or other input by the entity or individuals associated with the survey.

The method can further include receiving an identification of text from the transcription and, based on the text, retrieving and presenting a portion of the processed video that corresponds to the text.

In another aspect, the system can identify respective speakers of the text. Thus, additional functionality can be provided to the entity based on the understanding of which speakers spoke a particular word, phrase, sentence or paragraph. In this regard, as the entity interacts with the transcription and highlights a word, the system can play the video from the timing of that word through to the conclusion of that particular speaker that spoke the word. In another example, the system can push to the next speaker after that word and start the video from that point. The user can select a word and request a clip to the next speaker from that word. The clip can then be stored for later combining with other clips (if selected) into a highlight video.

There are a number of different scenarios in which the system can jump to the next speaker. As the entity selects clips for a highlight video, the system may automatically play a portion that is selected up to the next speaker or may start from the next speaker. When the user only highlights a word, the system may assume that the entity does not want a single word to be played. In that case, the system can begin the video at the moment that the word is spoken and play the video from that point to the conclusion of that speaker. The clip of that portion of the video can be added to a clip list as well based on that assumption.

Figure 6B:
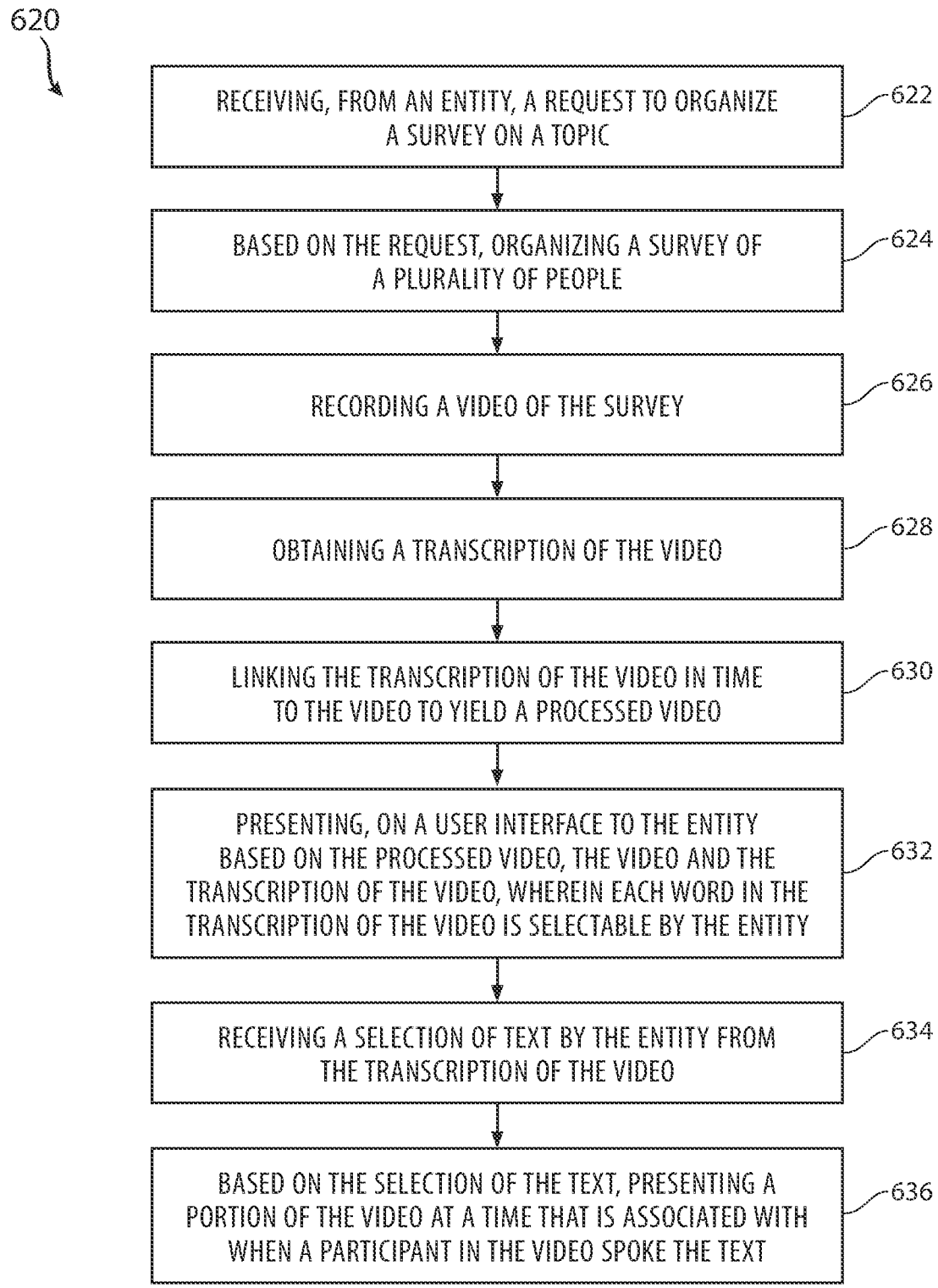
FIG. 6B illustrates another example method.

FIG. 6B illustrates another method example according to an aspect of this disclosure. A method 620 includes receiving, from an entity, a request to organize a survey on a topic (622), based on the request, organizing a survey of a plurality of people (624), recording a video of the survey (626), obtaining a transcription of the video (628), linking the transcription of the video in time to the video to yield a processed video (630), presenting, on a user interface to the entity based on the processed video, the video and the transcription of the video, wherein each word in the transcription of the video is selectable by the entity (632), receiving a selection of text by the entity from the transcription of the video (634) and, based on the selection of the text, presenting a portion of the video at a time that is associated with when a participant in the video spoke the text (636).

The method can further include receiving, from the entity, an identification of a first segment of the video based on a first user interaction with the transcription of the video, receiving, from the entity, an identification of a second segment of the video based on a second user interaction with the transcription of the video, receiving a confirmation from the entity to generate a highlight video based on the first segment and the second segment and, based on the confirmation, generating the highlight video which can include a concatenation of the first segment and the second segment.

In another aspect, the method can further include receiving a first title associated with the first segment, receiving a second title associated with the second segment and presenting the first title and the second title in the highlight video.

The method of course can also further include generating, based on the transcription, a first title associated with the first segment, generating, based on the transcription a second title associated with the second segment and presenting the first title and the second title in the highlight video.

The text can be classified as being associated with a respective speaker. Presenting the portion of the video at the time that is associated with when the participant in the video spoke the text further can include presenting the portion of the video up to a next speaker after the participant who spoke the text.

Figure 7:
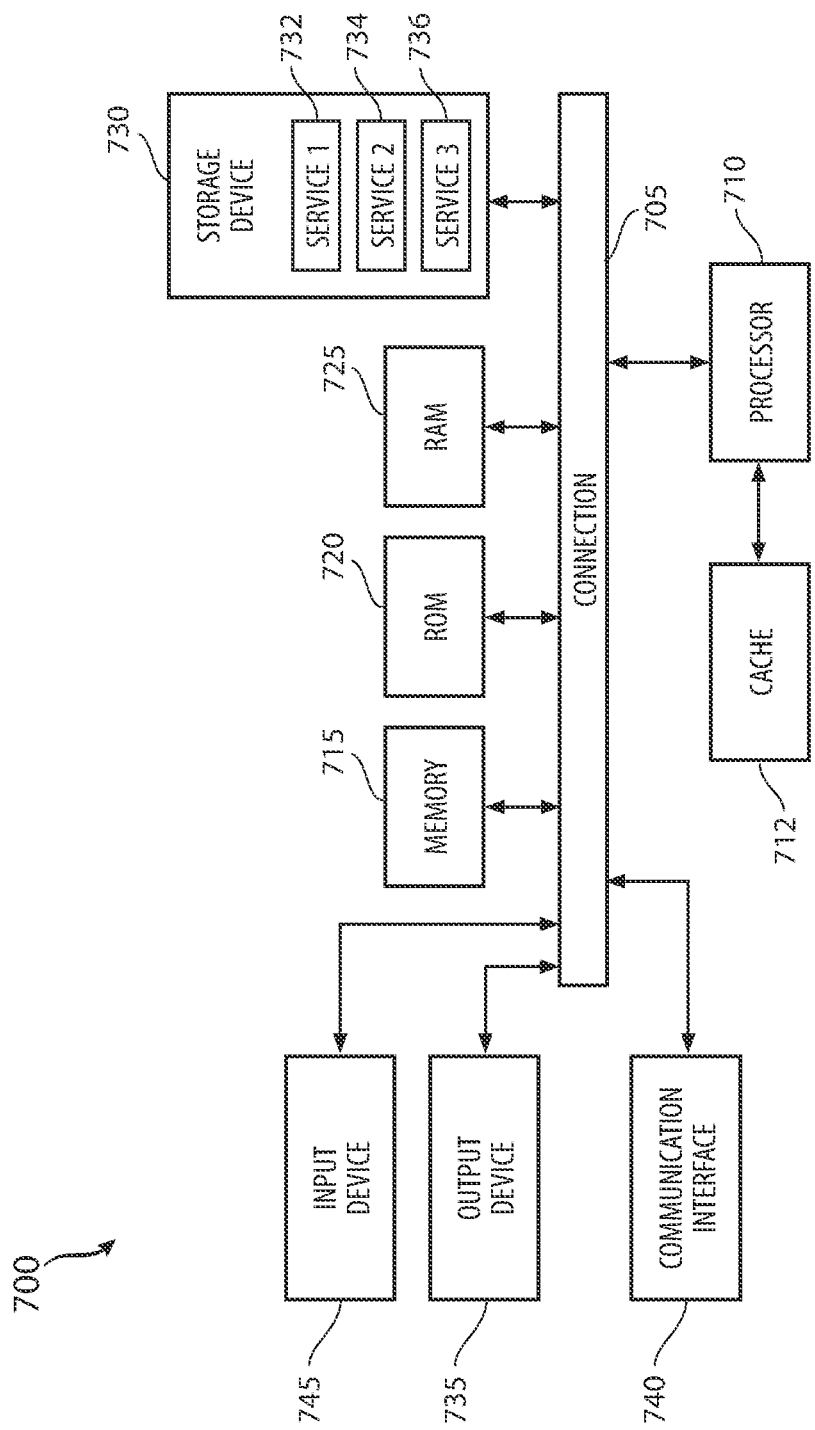
FIG. 7 illustrates an example system or computing device.

FIG. 7 illustrates an example computing system architecture of a system 700 which can be used to process data operations and requests, store data content and/or metadata, and perform other computing operations. In this example, the components of the system 700 are in electrical communication with each other using a connection 705, such as a bus. The system 700 includes a processing unit (CPU or processor) 710 and a connection 705 that couples various system components including a memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to cache 712 for quick access by the processor 710. In this way, the cache can provide a performance boost that avoids processor 710 delays while waiting for data. These and other modules can control or be configured to control the processor 710 to perform various actions. Other memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The computer-readable medium may include memory or data storage media, such as non-volatile random access memory (NVRAM), electrically erasable programmable read-only memory (EEPROM), FLASH memory, magnetic or optical data storage media, and the like.

The storage device 730 can include services 732, 734, 736 for controlling the processor 710. Other hardware or software modules are contemplated. The storage device 730 can be connected to the connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. A computer system programmed with the algorithms disclosed herein or incorporated herein by reference are a special-purpose computer system according to Patent Office Guidance. The computer executable instructions may be, for example, binaries, intermediate format instructions such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. A device can include a computing device, a display, a microphone, and a video camera to carry out the video conferencing features described herein. As such, the device(s), when including these specific input/output components, are not generic computer processors but more specific hardware devices. Any features described as modules or components may be implemented together in an integrated logic device or separately as discrete but interoperable logic devices. If implemented in software, the techniques may be realized at least in part by a computer-readable data storage medium can include program code including instructions that, when executed, performs one or more of the methods, algorithms, and/or operations described above. The computer-readable data storage medium may form part of a computer program product, which may include packaging materials.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
receiving an identification of a first segment of a video based on a first user interaction from a user with a transcription of the video to yield a first highlighted word;
receiving, while the transcription of the video shows the first highlighted word, a first user interaction with a clipping visual object;
based on the first user interaction with the clipping visual object, identifying a first clip of a first speaker associated with a full comment of the first speaker that contains the first highlighted word and presenting a first graphical object that identifies the first clip and that comprises a first field for receiving a first title associated with the first clip;
receiving an identification of a second segment of the video based on a second user interaction with the transcription of the video to yield a second highlighted word;
receiving, while the transcription of the video shows the second highlighted word, a second user interaction from the user with the clipping visual object;
based on the second user interaction with the clipping visual object, identifying a second clip of a second speaker associated with a full comment of the second speaker that contains the second highlighted word and presenting a second graphical object that identifies the second clip and that comprises a second field for receiving a second title associated with the second clip;
receiving a confirmation from the user via interaction with a video generation visual object to generate a highlight video based on the first clip and the second clip; and based on the confirmation, generating the highlight video comprising a concatenation of the first clip and the second clip.

2. The method of claim 1, wherein the first clip and the second clip are not contiguous.

3. The method of claim 1, further comprising:
receiving, via an interaction from the user with the transcription of the video, a selection of a chosen word by the user; and
based on the selection of the chosen word, presenting the video at a time that is associated with when a participant in the video spoke the chosen word.

4. The method of claim 3, further comprising:
identifying a portion of the video from the chosen word to a next speaker in the video; and
storing the portion of the video for selection by a user for inclusion in the highlight video comprising a subset of the video.

5. The method of claim 1, further comprising:
linking the transcription of the video in time to the video to yield a processed video;
receiving an identification of text from the transcription of the video; and
based on the text, retrieving and presenting a portion of the processed video that corresponds to the text.

6. The method of claim 1, wherein the transcription comprises a graphical transcription of the video.

7. The method of claim 1, wherein each word in the transcription of the video is selectable by a user.

8. A system comprising:
at least one processor; and
a non-transitory computer-readable medium storing instructions which, when executed by the at least one processor, cause the at least one processor to be configured to:
receive an identification of a first segment of a video based on a first user interaction with a transcription of the video to yield a first highlighted word;
receive, while the transcription of the video shows the first highlighted word, a first user interaction from a user with a clipping visual object;
based on the first user interaction with the clipping visual object, identify a first clip of a first speaker associated with a full comment of the first speaker that contains the first highlighted word and presenting a first graphical object that identifies the first clip and that comprises a first field for receiving a first title associated with the first clip;
receive an identification of a second segment of the video based on a second user interaction from the user with the transcription of the video to yield a second highlighted word;
receive, while the transcription of the video shows the second highlighted word, a second user interaction with the clipping visual object;
based on the second user interaction with the clipping visual object, identify a second clip of a second speaker associated with a full comment of the second speaker that contains the second highlighted word and presenting a second graphical object that identifies the second clip and that comprises a second field for receiving a second title associated with the second clip;
receive a confirmation from the user via interaction with a video generation visual object to generate a highlight video based on the first clip and the second clip; and
based on the confirmation, generate the highlight video comprising a concatenation of the first clip and the second clip.

9. The system of claim 8, wherein the first clip and the second clip are not contiguous.

10. The system of claim 8, wherein the non-transitory computer-readable medium stores additional instructions which, when executed by the at least one processor, cause the at least one processor to be configured to:
receive, via an interaction from the user with the transcription of the video, a selection of a chosen word by the user; and
based on the selection of the chosen word, present the video at a time that is associated with when a participant in the video spoke the chosen word.

11. The system of claim 10, wherein the non-transitory computer-readable medium stores additional instructions which, when executed by the at least one processor, cause the at least one processor to be configured to:
identify a portion of the video from the chosen word to a next speaker in the video; and
store the portion of the video for selection by a user for inclusion in the highlight video comprising a subset of the video.

12. The system of claim 8, wherein the non-transitory computer-readable medium stores additional instructions which, when executed by the at least one processor, cause the at least one processor to be configured to:
link the transcription of the video in time to the video to yield a processed video;
receive an identification of text from the transcription of the video; and
based on the text, retrieve and presenting a portion of the processed video that corresponds to the text.

13. The system of claim 8, wherein the transcription comprises a graphical transcription of the video.

14. The system of claim 8, wherein each word in the transcription of the video is selectable by a user.

15. A non-transitory computer-readable medium storing instructions which, when executed by at least one processor, cause the at least one processor to be configured to:
receive an identification of a first segment of a video based on a first user interaction with a transcription of the video to yield a first highlighted word;
receive, while the transcription of the video shows the first highlighted word, a first user interaction from a user with a clipping visual object;
based on the first user interaction with the clipping visual object, identify a first clip of a first speaker associated with a full comment of the first speaker that contains the first highlighted word and presenting a first graphical object that identifies the first clip and that comprises a first field for receiving a first title associated with the first clip;
receive an identification of a second segment of the video based on a second user interaction from the user with the transcription of the video to yield a second highlighted word;
receive, while the transcription of the video shows the second highlighted word, a second user interaction with the clipping visual object;
based on the second user interaction with the clipping visual object, identify a second clip of a second speaker associated with a full comment of the second speaker that contains the second highlighted word and presenting a second graphical object that identifies the second clip and that comprises a second field for receiving a second title associated with the second clip;

receive a confirmation from the user via interaction with a video generation visual object to generate a highlight video based on the first clip and the second clip; and based on the confirmation, generate the highlight video comprising a concatenation of the first clip and the second clip.

16. The non-transitory computer-readable medium of claim 15, wherein the first clip and the second clip are not contiguous.

17. The non-transitory computer-readable medium of claim 15, wherein the non-transitory computer-readable medium stores additional instructions which, when executed by the at least one processor, cause the at least one processor to be configured to:

receive, via an interaction from the user with the transcription of the video, a selection of a chosen word by the user; and based on the selection of the chosen word, present the video at a time that is associated with when a participant in the video spoke the chosen word.

18. The non-transitory computer-readable medium of claim 17, wherein the non-transitory computer-readable medium stores additional instructions which, when executed by the at least one processor, cause the at least one processor to be configured to:

identify a portion of the video from the chosen word to a next speaker in the video; and store the portion of the video for selection by a user for inclusion in the highlight video comprising a subset of the video.

19. The non-transitory computer-readable medium of claim 15, wherein the non-transitory computer-readable medium stores additional instructions which, when executed by the at least one processor, cause the at least one processor to be configured to:

link the transcription of the video in time to the video to yield a processed video;

receive an identification of text from the transcription of the video; and based on the text, retrieve and presenting a portion of the processed video that corresponds to the text.

20. The non-transitory computer-readable medium of claim 15, wherein the transcription comprises a graphical transcription of the video and wherein each word in the transcription of the video is selectable by a user.

* * * * *